(12) United States Patent  
Puttaswamy Naga et al.

(10) Patent No.: US 9,104,462 B2  
(45) Date of Patent: Aug. 11, 2015

(54) METHOD AND APPARATUS FOR PROVIDING TRAFFIC RE-AWARE SLOT PLACEMENT

(75) Inventors: Krishna P. Puttaswamy Naga, Edison, NJ (US); Ashok Anand, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/584,859

(22) Filed: Aug. 14, 2012

(65) Prior Publication Data

US 2014/0052973 A1 Feb. 20, 2014

(51) Int. Cl.
| | |
|---|---|
| G06F 3/00 | (2006.01) |
| G06F 9/00 | (2006.01) |
| G06F 9/455 | (2006.01) |
| G06F 9/50 | (2006.01) |

(52) U.S. Cl.
CPC .......... *G06F 9/45558* (2013.01); *G06F 9/5077* (2013.01)

(58) Field of Classification Search
CPC ........................ G06F 9/5077; G06F 9/45558
See application file for complete search history.

(56) References Cited

U.S. PATENT DOCUMENTS

| 7,120,904 | B1 * | 10/2006 | Robison ........................ 717/155 |
|---|---|---|---|
| 8,589,921 | B2 * | 11/2013 | Heim ................................ 718/1 |
| 8,667,171 | B2 * | 3/2014 | Guo et al. ..................... 709/238 |
| 8,681,649 | B2 * | 3/2014 | Parekh et al. ................. 370/252 |
| 2009/0019222 | A1 * | 1/2009 | Verma et al. .................. 711/114 |
| 2010/0027420 | A1 * | 2/2010 | Smith ........................... 370/235 |
| 2010/0254377 | A1 * | 10/2010 | Akella et al. .................. 370/389 |
| 2011/0225277 | A1 * | 9/2011 | Freimuth et al. .............. 709/223 |
| 2011/0282932 | A1 * | 11/2011 | Ramjee et al. ................ 709/203 |
| 2011/0283062 | A1 * | 11/2011 | Kumagai et al. .............. 711/114 |
| 2012/0084445 | A1 * | 4/2012 | Brock et al. .................. 709/226 |
| 2013/0094536 | A1 * | 4/2013 | Hui et al. ...................... 375/133 |
| 2013/0191827 | A1 * | 7/2013 | Ashok et al. ..................... 718/1 |
| 2013/0268672 | A1 * | 10/2013 | Justafort et al. .............. 709/226 |

OTHER PUBLICATIONS

Ingmar Neumann; Dominik Stoffel; Hendrik Hartje; Wolfgang Kunz; "Cell Replication and Redundancy Elimination During Placement for Cycle Time Optimization", 1999 IEEE.*

Andrzej Kochut, Alexei Karve, "Leveraging Local Image Redundancy for Efficient Virtual Machine Provisioning", 2012 IEEE.*

Wenyu Zhou; Shoubao Yang; Jun Fang; Xianlong Niu; Hu Song; , "VMCTune: a Load Balancing Scheme for Virtual Machine Cluster Using Dynamic Resource Allocation," Grid and Cooperative Computing (GCC), 2010 9th International Conference on , vol., No., pp. 81-86, Nov. 1-5, 2010.*

Apostolopoulos, G.; Hassapis, C.; , "V-eM: a Cluster of Virtual Machines for Robust, Detailed, and High-Performance Network Emulation," Modeling, Analysis, and Simulation of Computer and Telecommunication Systems, 2006. MASCOTS 2006. 14th IEEE International Symposium on , vol., No., pp. 117-126, Sep. 11-14, 2006.*

(Continued)

*Primary Examiner* — Jing-Yih Shyu

(74) *Attorney, Agent, or Firm* — C. Bllicska

(57) ABSTRACT

A method and apparatus of providing an RE-aware technique for placing slots based on redundancy across and within slot communication pairs. In particular, the RE-aware placement strategy takes into account the redundancy in data transfers for slot-to-slot communications and place slots to exploit redundancy in data transfers while minimizing the overall inter-rack (or inter-data center) bandwidth usage.

17 Claims, 10 Drawing Sheets

(56) References Cited

OTHER PUBLICATIONS

"Redundancy-Aware Routing with Limited Resources" by Yang Song, Katherine Guo, and Lixin Gao, IEEE 2010.*

Spring, Neil T. and Wetherall, David: "A Protocol-Independent Technique for Eliminating Redundant Network Traffic", in Proceedings of ACM SIGCOMM, 2000, Computer Science and Engineering, University of Washington, Seattle, WA, USA, 9 pages.

Aggarwal, B. et al: "EndRE: an End-System Redundancy Elimination Service for Enterprises", Proceedings of the 7th ACM/USENIX Symposium on Networked Systems Design and Implementation (NSDI), Apr. 2010, University of Wisconsin-Madison, Microsoft Research India, 14 pages.

Meng, X. et al: "Improving the Scalability of Data Center Networks with Traffic-aware Virtual Machine Placement", INFOCOM, 2010 Proceedings IEEE, Mar. 14-19, 2010, T.J. Watson Research Center, IBM, Hawthorne, NY, USA, 9 pages.

Anand, A. et al: "Redundancy in Network Traffic: Findings and Implications", SIGMETRICS 2009 Proceedings of the eleventh international joint conference on Measurement and Modeling of computer systems, ACM, New York, NY, USA, 12 pages.

Anand, A. et al: "Packet Caches on Routers: the Implications of Universal Redundant Traffic Elimination", in Proceedings of the ACM SIGCOMM, Aug. 17-22, 2008, Seattle, Washington, USA, 12 pages.

Aaron Gember et al: "Stratos: Virtual Middleboxes as First-Class Entities", Jun. 18, 2012, pp. 1-15, [http://pages.cs.wisc.edu/-akella/CS838/FI2/838-CloudPapers/Stratos.pdf [retrieved on Nov. 21, 2013] p. 8-p. 9].

Meng Wang et al: "Consolidating virtual machines with dynamic bandwidth demand in data centers", INFOCOM, 2011 Proceedings IEEE, IEEE, Apr. 10, 2011, pp. 71-75.

Gupta D et al: "Difference Engine: Harnessing Memory Redundancy in Virtual Machines", Proceedings of the USENIX Symposium on Operating Systems Design and Implementation, Dec. 10, 2008 (Dec. 10, 2006), pp. 309-322.

Kochut A et al: "Leveraging local image redundancy for efficient virtual machine provisioning". 2012 IEEE Network Operations and Management Symposium (NOMS 2012) : Maui, Hawaii, USA, Apr. 16-20, 2012, IEEE, Piscataway, NJ, Apr. 16, 2012, pp. 179-187.

PCT International Search Report dated Nov. 28, 2013 (PCT/US2013/051436), 5 pages.

* cited by examiner

```
1   First phase
2       Pick K random VMs
3       Randomly assign each of these VM to a unique container
4       while (all VMs are not assigned)
5           $Mindist \leftarrow \infty, Min\,VM \leftarrow \emptyset, Min\,C \leftarrow \emptyset$
6           For each VM $u$, that is not assigned
7               $Mindist_u \leftarrow \infty$
8               For each container $C$
9                   $M_{from} \leftarrow \sum_{v \in C} Uni_{u,v}$
10                  $M_{from} \leftarrow M_{from} + \sum_{v \in C, w \notin C} Inter_{u,v,u,w}$
11                  $M_{to} \leftarrow \sum_{v \in C} Uni_{v,u}$
12                  $M_{to} \leftarrow M_{to} + \sum_{v \in C, w \notin C} Inter_{v,u,w,u}$
13                  $N \leftarrow$ number of VMs assigned to $C$
14                  $M \leftarrow \frac{M_{to} + M_{from}}{N}$
15                  $dist_{u,C} \leftarrow \frac{1}{M}$
16                  if $dist_{u,C} < Mindist_u$
17                      $Mindist_u \leftarrow dist_{u,C}$
18                  if $Mindist_u < Mindist$
19                      $Mindist \leftarrow Mindist_u$
20                      $Min\,VM \leftarrow u, Min\,C \leftarrow C$
21          Assign VM $Min\,VM$ to container $Min\,C$
```

```
1  Estimate inter-container bandwidth usage
2      total ← 0
3      For each pair of containers $C_i$, $C_j$
4          For each VM pair $u \to v$, where $u \in C_i$, $v \in C_j$
5              total ← total + $Uni_{u,v}$
6              For all VM pairs $w, y$ other than $(u, v)$
7                  If $w \in C_i$ and $y \in C_j$
8                      total ← total
9                  else
10                     total ← total + $Inter_{u,v,w,y}$
11     return total
```

```
1   Second phase
2       Min_current ← (estimate inter-container BW usage)
3       Min_estimate ← ∞, Min_u ← ∅, Min_v ← ∅
4       For each pair of containers C_i, C_j
5           For each VM u in C_i
6               For each VM v in C_j
7                   Assign u to C_j, v to C_i
8                   Estimate InterContainer_usage
9                   If InterContainer_usage < Min_estimate
10                      Min_estimate ← InterContainer_usage
11                      Min_u ← u, Min_v ← v
12                  Assign back u to C_i, v to C_j
13      If Min_estimate < Min_current
14          C_a ← container (Min_u), C_b ← container (Min_j)
15          Assign u to C_j, v to C_i
16          Min_current ← Min_estimate
17          Go to step 3
18      else
19          No more optimization. Stop.
```

METHOD AND APPARATUS FOR PROVIDING TRAFFIC RE-AWARE SLOT PLACEMENT

TECHNICAL FIELD

The inventions relate generally to methods and apparatus for providing slot placement.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known virtual machine placement strategies, virtual machines are placed in data center racks based on minimizing the bandwidth requirements of data transfers across racks.

SUMMARY OF SOME EMBODIMENTS

Various embodiments provide a method and apparatus of providing an RE-aware technique for placing slots based on redundancy across and within slot communication pairs.

In one embodiment, an apparatus is provided for providing slot placement. The apparatus includes a data storage and a processor communicatively connected to the data storage. The processor is programmed to: determine a plurality of slots to be placed within a plurality of containers; determine a plurality of redundancy parameters; and determine a placement of the plurality of slots in the plurality of containers based on the plurality of redundancy parameters.

In some of the embodiments, a plurality of the plurality of slots are virtual machines.

In some of the embodiments, a plurality of the plurality of containers are racks in a data center.

In some of the embodiments, the redundancy parameters are based on intra-comm-redundancy and inter-comm-redundancy of at least a portion of the plurality of slots.

In some of the embodiments, the redundancy parameters are based on communication patterns of at least a portion of the plurality of slots.

In some of the embodiments, the determination of the placement of the plurality of slots comprises programming the processor to: determine a plurality of clusters; assign each of at least a portion of the plurality of slots to at least one of the plurality of clusters; and assign each of at least a portion of the plurality of clusters to the at least one of the plurality of containers.

In some of the embodiments, the assignment of the portion of the plurality of slots is based on a required slot bandwidth after redundancy elimination.

In some of the embodiments, the assignment of the portion of the plurality of slots is further based on one or more slot placement constraints.

In some of the embodiments, the assignment of the portion of the plurality of clusters is based on an effective-inter-container-bandwidth-usage.

In some of the embodiments, the determination of the placement of the plurality of slots comprises further programming the processor to exchange a first placed slot and a second placed slot based on a determination that inter-container-bandwidth-usage will be improved and that the exchange meets one or more inter-container bandwidth constraints.

In a second embodiment, a switching system for providing slot placement. The system including: a placement controller and a plurality of agents communicatively connected to the placement controller. The plurality of agents are programmed to: collect a plurality of redundancy measurements and send the plurality of redundancy measurements to the placement controller. The placement controller is programmed to: receive the plurality of redundancy measurements, determine a plurality of slots to be placed within a plurality of containers, determine a plurality of redundancy parameters based on the plurality of redundancy measurements, and determine a placement of the plurality of slots in the plurality of containers based on the plurality of redundancy parameters.

In some of the embodiments, the determination of the placement of the plurality of slots comprises programming the placement controller to: determine a plurality of clusters, assign each of at least a portion of the plurality of slots to at least one of the plurality of clusters, and assign each of at least a portion of the plurality of clusters to the at least one of the plurality of containers.

In some of the embodiments, the assignment of the portion of the plurality of slots is based on a required slot bandwidth after redundancy elimination.

In some of the embodiments, the assignment of the portion of the plurality of slots is further based on one or more slot placement constraints.

In some of the embodiments, the assignment of the portion of the plurality of clusters is based on an effective-inter-container-bandwidth-usage.

In some of the embodiments, the determination of the placement of the plurality of slots comprises further programming the placement controller to: exchange a first placed slot and a second placed slot based on a determination that inter-container-bandwidth-usage will be improved and that the exchange meets one or more inter-container bandwidth constraints.

In a third embodiment, a method is provided for providing slot placement. The method including: determining a plurality of slots to be placed within a plurality of containers, determining a plurality of redundancy parameters, and determining a placement of the plurality of slots in the plurality of containers based on the plurality of redundancy parameters.

In some of the embodiments, the method further includes exchanging a first placed slot and a second placed slot based on a determination that inter-container-bandwidth-usage will be improved and that the exchange meets one or more inter-container bandwidth constraints.

In some of the embodiments, the step of determining the placement of the plurality of slots includes: determining a plurality of clusters, assigning each of at least a portion of the plurality of slots to at least one of the plurality of clusters, and assigning each of at least a portion of the plurality of clusters to the at least one of the plurality of containers.

In some of the embodiments, the step of assigning the portion of the plurality of slots is based on a required slot bandwidth after redundancy elimination.

BRIEF DESCRIPTION OF THE DRAWINGS

Various embodiments are illustrated in the accompanying drawings, in which:

FIG. 7 depicts pseudo code illustrating an embodiment of steps 610-640 of FIG. 6;

FIG. 8 depicts pseudo code illustrating an embodiment of step 650 of FIG. 6;

FIG. 9 depicts pseudo code illustrating an embodiment of step 670 of FIG. 6.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus of providing an RE-aware technique for placing slots based on redundancy across and within slot communication pairs. Advantageously, such placement may reduce overall bandwidth usage of inter-container (e.g., racks or data center) links.

Figure 1:
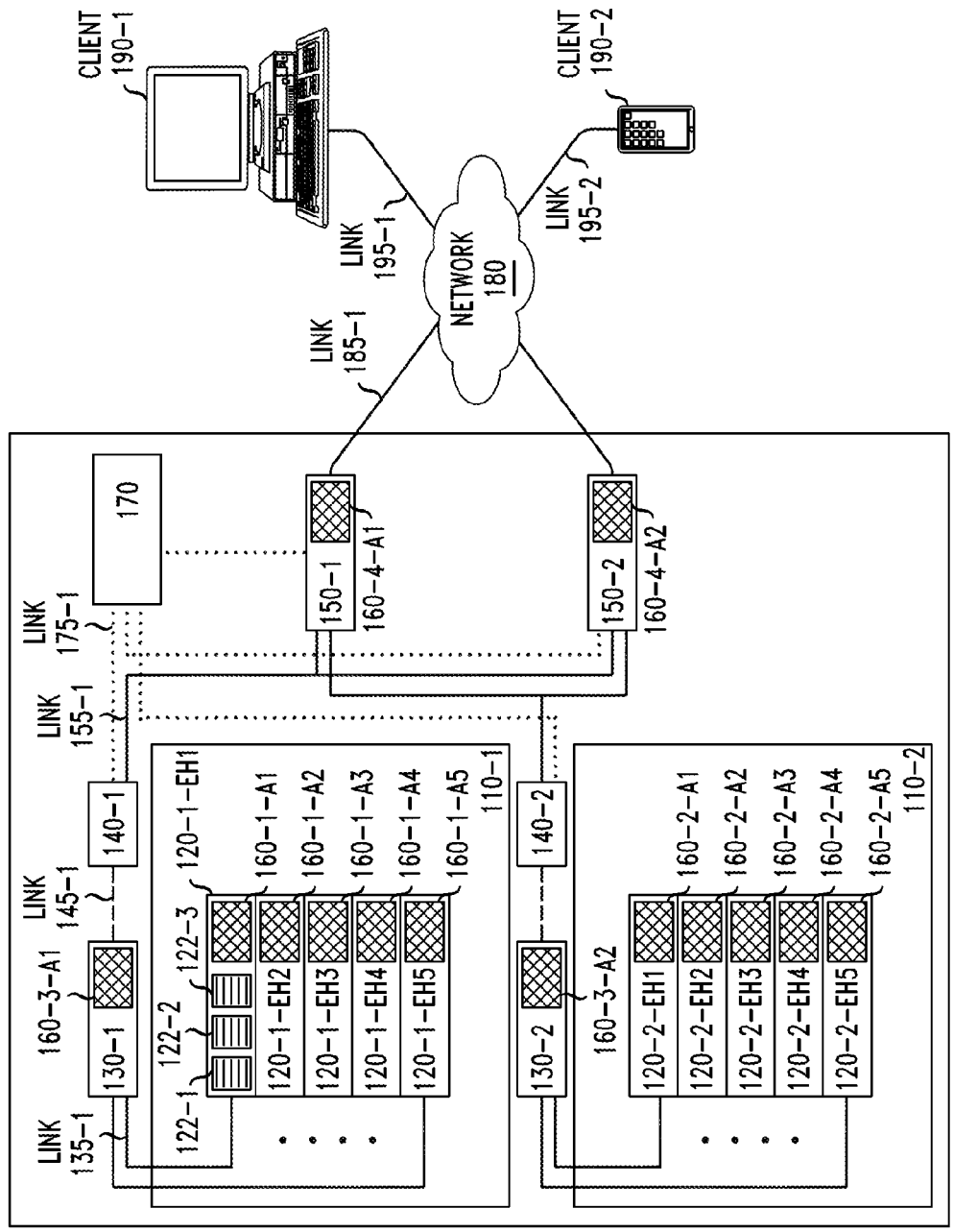
FIG. 1 illustrates an embodiment of an RE-aware data center 100 serving clients 190-1 and 190-2 via network 180.

FIG. 1 illustrates an embodiment of an RE-aware data center 100 serving clients 190-1 and 190-2 via network 180. The RE-aware data center 100 includes racks 110-1 and 110-2 (collectively, racks 110), top of the rack switches 130-1 and 130-2 (collectively, ToR switches 130), redundancy elimination (RE) boxes 140-1 and 140-2 (collectively, RE boxes 140), aggregation switches 150-1-150-2 (collectively, aggregation switches 150) and placement controller 170. The RE-aware data center 100 also includes links 135-1, 145-1, 155-1, 175-1, and 185-1 (collectively, RE-aware data center links) (remaining link labels have been omitted for the purpose of clarity). Racks 110 are communicatively connected with network 180 via an appropriate one of the ToR switches 130, RE boxes 140, aggregation switches 150, and appropriate RE-aware data center links. It should be appreciated that RE-aware data center 100 may be architected in any suitable configuration and that RE-aware data center 100 is just one exemplary architecture being used for illustrative purposes. Placement controller 170 controls the allocation of resources (e.g., processing, memory, storage or networking) in racks 110 within RE-aware data center 100.

Racks 110 include end hosts 120-1-EH1-120-1-EH5 and 120-2-EH1-120-2-EH5 (collectively, end hosts 120). It should be appreciated that while 2 racks are illustrated here, system 100 may include more of less racks. It should be further appreciated that not all of the racks of system 100 may include end hosts.

End host 120-1-EH1 include slots 122-1-122-3 (collectively, slots 122) (illustrated as hashed boxes) and agent 160-1-A1 (illustrated as checkered box). It should be appreciated that while 3 slots are illustrated in end host 120-1-EH1, each of end hosts 120 may include fewer or more slots (remaining slots have been omitted for the purpose of clarity), including some end hosts having no slots. It should be further appreciated that while one (1) agent is illustrated in each of end hosts 120 (e.g., agents 160-1-A1-160-1-A5 and 160-2-A1-160-2-A5), each of end hosts 120 may include fewer of more agents, including some end hosts having no agents.

Slots 122 are a collection of allocated resources configured to service application instances serving clients 190-1 and 190-2 (collectively, clients 190). The term "slot" as user herein may be any suitable collection of allocated resources such as a virtual machine comprising processing/compute, memory or networking resources or virtualized storage.

ToR switches 130 switch data between end hosts in an associated rack and appropriate aggregate switch(es). For example, ToR switch 130-1 switches data from end hosts in rack 110-1 to end hosts in other racks (e.g., rack 110-2) or network 180 via aggregate switch 150-1 or 150-2.

RE boxes 140 perform redundancy elimination. In particular, RE boxes 140 cache received data and suppress duplicate traffic. It should be appreciated that while two (2) RE boxes are illustrated system 100 may include fewer of more RE boxes. It should be further appreciated that though illustrated as being placed after ToR switches in system 100, RE boxes may be placed in any suitable portion of system 100 to perform redundancy elimination. Moreover, though illustrated as a separate component, RE boxes 140 may include any configuration such as: (a) a separate redundancy elimination component; (b) a software module residing on a component such as one or more of the end hosts 120 or one or more of the ToR switches 130; (c) or any other configuration combination.

For example, a source RE box (e.g., RE box 140-1) may create an identifier associated with received data from an end host (e.g., end host 120-1-EH1) and transmits the created identifier to a target RE box (e.g., RE box 140-2). In subsequent transmissions between the source and target RE box (in either direction), a sourcing RX box (e.g., RE box 140-1) may perform data de-duplication by replacing subsequent repeated byte sequences of newly received data with the created identifier to reduce application latency and conserve bandwidth. In this example, the receiving RE box (e.g., RE box 140-2) uses the created identifier to retrieve the complete stored byte sequence and forwards the retrieved byte sequence to it destination (e.g., end host 120-2-EH1).

Aggregation switches 150 switch data between an associated ToR switch and network 180. For example, ToR switch 130-1 switches data from resources in rack 110-1 to network 180 via an appropriate aggregation switch (e.g., aggregation switch 150-1 or 150-2).

Agents 160-1-A1-160-1-A5, 160-2-A1-160-2-A5, 160-3-A1-160-3-A2, and 160-4-A1-160-4-A2 (collectively, agents 160) measure the redundancy in communications (e.g., slot-to-slot) and report these measurements to placement controller 170 via one or more appropriate RE-aware data center links. The term "redundancy" as used herein means any content sequence capable of being de-duplicated by RE boxes 140 and should be understood broadly as including any repeated content sequence. It should be appreciated that though illustrated as residing in each of end hosts 120, ToR switches 130 and aggregation switches 150, system 100 may include any configuration of agents. For example, agents may be deployed: (a) on a portion or all of end hosts 120; (b) on a portion or all of end hosts 120, and a portion or all of aggregation switches 150; (c) or any other configuration combination.

On end hosts 120, an agent may monitor slot-to-slot communications for slots residing on the end hosts. On ToR switches 130, an agent may monitor: (a) slot-to-slot communications from slots on different end hosts within a rack; (b) communications among end hosts within the rack; (c) communications among an end host within the rack and an end host on other racks; or (d) the like. In an embodiment including a distributed data center setting, agents on aggregation switches 150 may monitor the outgoing communications to other data centers.

Placement controller 170 includes assigns slots (e.g., one or more of slots 122) to containers (e.g., one of racks 110 or a data center in a distributed data center). It should be appreciated that while one (1) placement controller is illustrated here, system 100 may include more placement controllers or that there could be one placement controller for a set of data centers. In some of these embodiments, though illustrated within system 100, placement controller 170 may be positioned outside of system 100 and connected to system 100 via network 180.

RE-aware data center links and links 195-1 and 195-2 support communicating over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, links may be any number or combinations of communication channels.

The network 180 includes any number of access and edge nodes and network devices and any number and configuration of links (not shown for purposes of clarity). Moreover, it should be appreciated that network 180 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

Clients 190-1 and 190-2 may include any type of communication device(s) capable of sending or receiving information over network 180 via an appropriate one of links 195-1 or 195-2. For example, a communication device may be a thin client, a smart phone (e.g., client 190-2), a personal or laptop computer (e.g. 190-1), server, network device, tablet, e-reader or the like. Communication devices may rely on other resources within exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

In some embodiments, some or a portion of slots 122 are virtual machines.

In some embodiments, some or a portion of slots 122 are virtualized storage.

In some embodiments, ToR switches 130 are Ethernet switches.

In some embodiments, aggregation switches 150 are layer 2 Ethernet switches.

In some embodiments of RE-aware data center 100, RE-aware data center 100 is a distributed data center in a system of distributed data centers. In some of these embodiments, RE boxes 140 may be placed after aggregation switches 150 (e.g., between the aggregation switches 150 and network 180) in place of or in addition to their illustrated placement after ToR switches 130. Advantageously, if RE-aware data center 100 does not accommodate all slots of an application instance (e.g., some slots are allocated in other data centers), the RE-aware data center 100 may be used to reduce the inter-data center traffic in order to more efficiently utilize the bandwidth between these distributed data centers.

Figure 2:
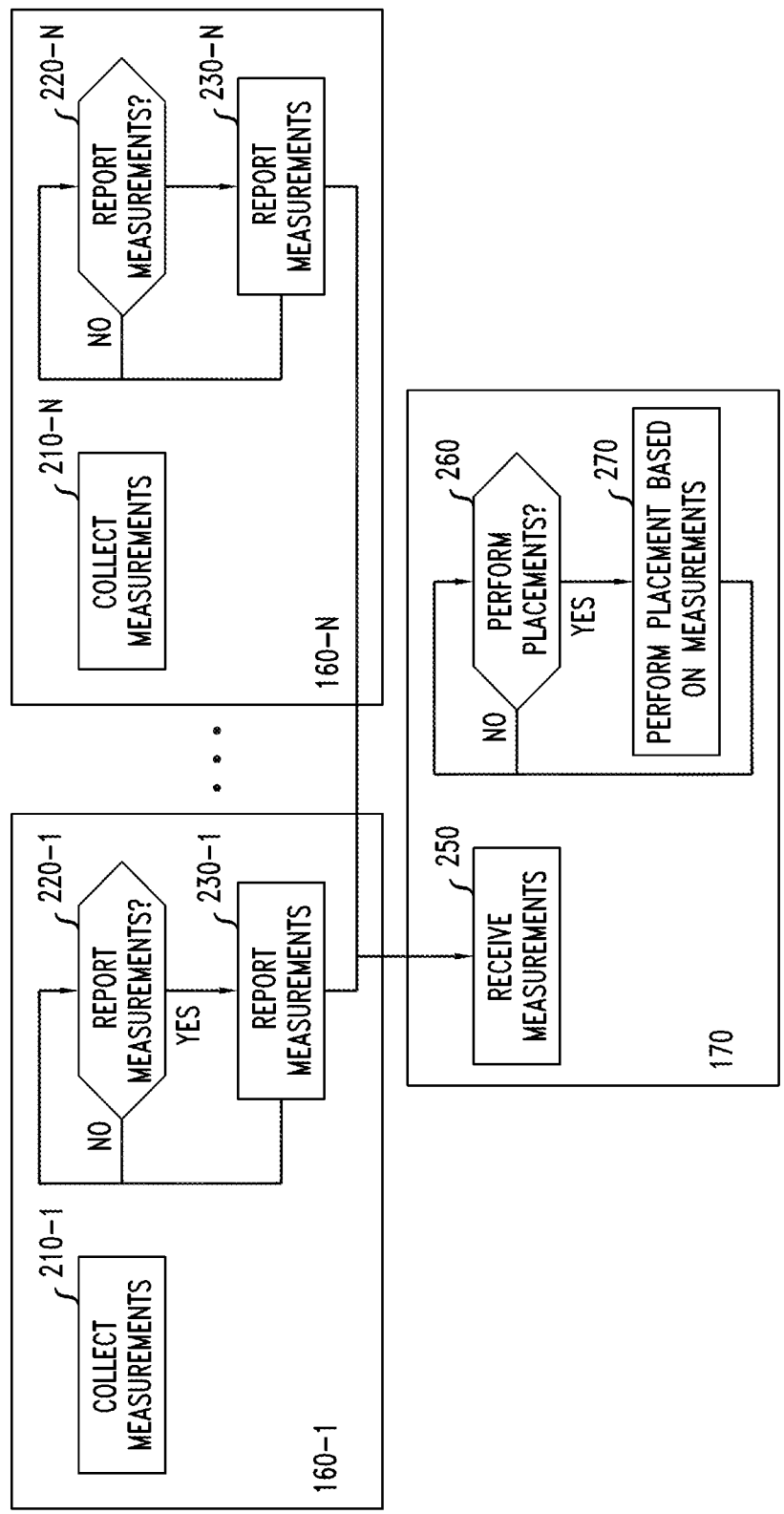
FIG. 2 depicts a flow chart illustrating an embodiment of a method 200 for an RE-aware system (e.g., RE-aware data center 100 of FIG. 1) to perform RE-aware placements of slots.

FIG. 2 depicts a flow chart illustrating an embodiment of a method 200 for an RE-aware system (e.g., RE-aware data center 100 of FIG. 1) to perform RE-aware placements of slots. The method includes one or more agents 160-1-160-N (e.g., one or more of agents 160 of FIG. 1) collecting redundancy measurements (steps 210-1-210-N) and reporting the collected measurements (steps 230-1-230-N) to the placement controller 170 (e.g., placement controller 170 of FIG. 1) based on a determination that a reporting trigger has occurred (steps 220-1-220-N). The method further includes the placement controller 170 receiving the measurements (step 250) from agents 160-1-160-N and performing slot placement based on the received measurements (step 270) based on a determination that a placement trigger has occurred (step 260).

In the method 200, the steps 210-1-210-N include collecting redundancy measurements. In particular, measurements include slot communication patterns and the determined redundancy associated with slot pair(s). Communication patterns may be a traffic matrix of the collected measurements between slots and the determined redundancy may include the redundant traffic identified between slot-to-slot communications in the traffic matrix.

In the method 200, the steps 220-1-220-N include determining that a reporting trigger has occurred. Based on the trigger determination, the method either proceeds to one of steps 230-1-230-N respectively or returns to one of steps 220-1-220-N respectively. The trigger may be any suitable event signaling that collected measurements should be sent to placement controller 170. For example, the trigger event may be: (a) periodically triggered at threshold intervals; (b) based on the measurements collected in one of steps 210-1-210-N respectively; (c) based on receipt of a request from placement controller 170; or (d) the like. It should be appreciated that multiple trigger events may occur at the same time.

In the method 200, the steps 230-1-230-N include reporting the collected measurements to placement controller 170. In particular, collected measurements may be reported in any suitable form such as: (a) the raw collected measurements; (b) compressed or modified information based on the collected measurements; (c) an aggregate of the collected measurements; or (d) the like.

In the method 200, the step 250 includes receiving measurements from one or more of agents 160-1-160-N.

It should be appreciated that the measurements may be pushed or pulled to the apparatus performing the method.

In the method 200, the step 260 includes determining that a placement trigger has occurred. Based on the trigger determination, the method either proceeds to steps 270 or returns to step 260. The trigger may be any suitable event signaling that a placement should be performed. For example, the trigger event may be: (a) periodically triggered at threshold intervals; (b) based on the agent measurements received in step 250; or (c) the like. It should be appreciated that multiple trigger events may occur at the same time. A quality threshold may be any suitable threshold such as the current effective inter-container bandwidth being greater than a threshold limit as compared to an estimate optimal effective inter-container bandwidth.

In the method 200, the step 270 includes placing the slots in the end hosts (e.g., end hosts 120 in FIG. 1). In particular, the slots to be placed in end hosts are determined and are placed in end hosts based on the agent measurements received in step 250.

In some embodiments of one or more of steps 210-1-210-N, redundancy measurements include measurements of redundancy in intra-communication-redundancy or inter-communication-redundancy in slot-to-slot communications.

The term "intra-comm-redundancy" as used herein means the redundancy within slot-to-slot communications and should be understood broadly as including the redundancy between any slot-to-slot communication. For example, the redundancy between: (a) slot 122-1 and 122-3 of FIG. 1; (b) 122-1 and a slot (not shown) in end host 120-2-EH1 of FIG. 1; (c); 322-SLOT1 and 322-SLOT2 of FIG. 3 or (d) 322-SLOT1 and 322-SLOT3 of FIG. 3.

The term "inter-comm-redundancy" as used herein means the redundancy between two slot-to-slot communications and should be understood broadly as including the redundancy between any two slot-to-slot communications. For example, the redundancy between: (a) slot-to-slot pair slot 122-1/122-3 and slot-to-slot pair 122-1 and a slot (not shown) in end host 120-2-EH1 of FIG. 1; or (b); slot-to-slot pair 322-SLOT1/322-SLOT3 and slot-to-slot pair 322-SLOT2/322-SLOT-4 of FIG. 3 is inter-comm-redundancy.

In some embodiments of the step 250, an API may be provided for communication between a placement controller and agent (e.g., placement controller 170 and one or more of agents 160 of FIG. 1). In some of these embodiments, a placement controller may request all of a portion of collected redundancy measurements from one or more agents.

In some embodiments, portions of steps 260 and 270 may be performed concurrently. For example, a placement trigger in step 260 may involve determining whether the current effective inter-container bandwidth meets the estimated optimal effective inter-container bandwidth. As should be appreciated, determining the estimated optimal effective inter-container bandwidth may require a determination of the optimal placement of virtual machines. As such, the same determined optimal placement of virtual machines may be used in both steps 260 and 270.

Figure 3:
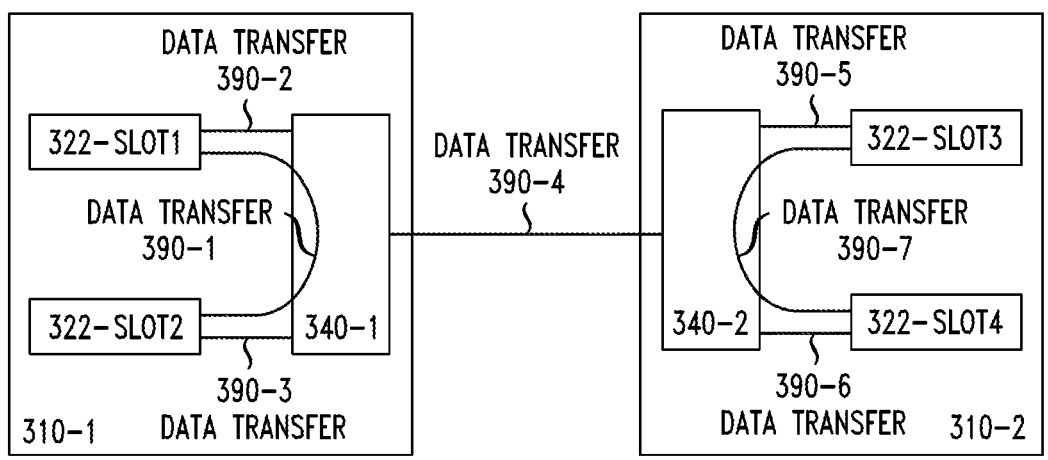
FIG. 3 illustrates a functional block diagram 300 of redundancy in an RE-aware data center 100.

FIG. 3 illustrates a functional block diagram 300 of redundancy in a RE-aware data center 100. Diagram 300 includes rack 310-1 and 310-2 (e.g., two of racks 110 in FIG. 1) and RE boxes 340-1 and 340-2. Rack 310-1 includes slots 322-SLOT1 and 322-SLOT2 and rack 310-2 includes slots 322-SLOT3 and 322-SLOT4. Data transfer paths 390-1-390-7 illustrate data transfer paths between components. RE boxes are positioned to de-duplicate data over the network links illustrated by data transfer 390-4.

In some embodiments such as distributed data center embodiments, rack 310-1 and 310-2 may be data centers.

In some embodiments, RE boxes 340-1 or 340-2 may include more than one RE box. For example, separate RE boxes may be software modules executing on one or more of the end hosts.

In the examples below, assume the following:
1) each of slots 322-SLOT1-322-SLOT4 may be allocated one of four virtual machines: VM1, VM2, VM3 and VM4;
2) there is inter-comm-redundancy between VM1→VM3 and VM2→VM4 (i.e., there is a high similarity between data transfers that may be de-duplicated by RE boxes 340-1 and 340-2);
3) the bandwidth requirements of the data traffic between VM1 and VM2 is 8V;
4) the bandwidth requirements of the data traffic between VM1 and VM3 is 10V;
5) the bandwidth requirements of the data traffic between VM3 and VM4 is 7V;
6) the bandwidth requirements of the data traffic between VM2 and VM4 is 10V.

In a first example, the four virtual machines are assigned to slots using a bandwidth-based placement strategy that places the VM pairs having higher bandwidth traffic within the same rack. As such, VM1 and VM3 are placed in the same rack and VM2 and VM4 are placed in the same rack. For example the placements may be: VM1 assigned to 322-SLOT1, VM3 assigned to 322-SLOT2, VM2 assigned to 322-SLOT3 and VM4 assigned to 322-SLOT4. As such the bandwidth requirements across data transfer links would be:
7) 10V between 322-SLOT1 and 322-SLOT2 via 390-1;
8) 8V between 322-SLOT1 and 322-SLOT3 via 390-2→RE box 340-1→390-4→RE box 340-2 and 390-5;
9) 7V between 322-SLOT2 and 322-SLOT4 via 390-3→RE box 340-1→390-4→RE box 340-2 and 390-6; and
10) 10V between 322-SLOT3 and 322-SLOT4 via 390-7.

In this example, the inter-rack bandwidth requirement (i.e., the bandwidth over data transfer 390-4) is 15V as shown below.

8V for traffic between slot 322-SLOT1 and slot 322-SLOT3
+7V for traffic between slot 322-SLOT2 and slot 322-SLOT4.

In a second example, the four virtual machines are assigned to slots using an RE-aware placement strategy as described herein. As such, VM1 and VM2 are placed in the same rack and VM3 and VM4 are placed in the same rack. For example the placements may be: VM1 assigned to 322-SLOT1, VM2 assigned to 322-SLOT2, VM3 assigned to 322-SLOT3 and VM4 assigned to 322-SLOT4. As such the bandwidth requirements across data transfer links would be:
11) 8V between 322-SLOT1 and 322-SLOT2 via 390-1;
12) 10V between 322-SLOT1 and 322-SLOT3 via 390-2→RE box 340-1→390-4→RE box 340-2 and 390-5;
13) 10V between 322-SLOT2 and 322-SLOT4 via 390-3→RE box 340-1→390-4→RE box 340-2 and 390-6; and
14) 7V between 322-SLOT3 and 322-SLOT4 via 390-7.

In this example, the inter-rack bandwidth requirement (i.e., the bandwidth over data transfer 390-4) is 10V as shown below. It should be appreciated that the inter-comm-redundancy (i.e., similarity between data transfers 322-SLOT1→322-SLOT3 and 322-SLOT2→322-SLOT4) is exploited in this example as the inter-comm-redundancy slot pairs traverse the RE box pair 340-1 and 340-2 allowing de-duplication of data.

10V for traffic between slot 322-SLOT1 and slot 322-SLOT3

+10V for traffic between slot 322-SLOT2 and slot 322-SLOT4.

−10V for data de-duplicated by RE box pair 340-1 and 340-2.

Thus, in this example, by exploiting the high similarity between data transfers, the RE-aware placement strategy significantly reduced the bandwidth usage of inter-rack (or inter-data center in a distributed data center) link 390-4 by 33% over a bandwidth-based placement strategy (i.e., 10V compared with 15V).

Figure 4:
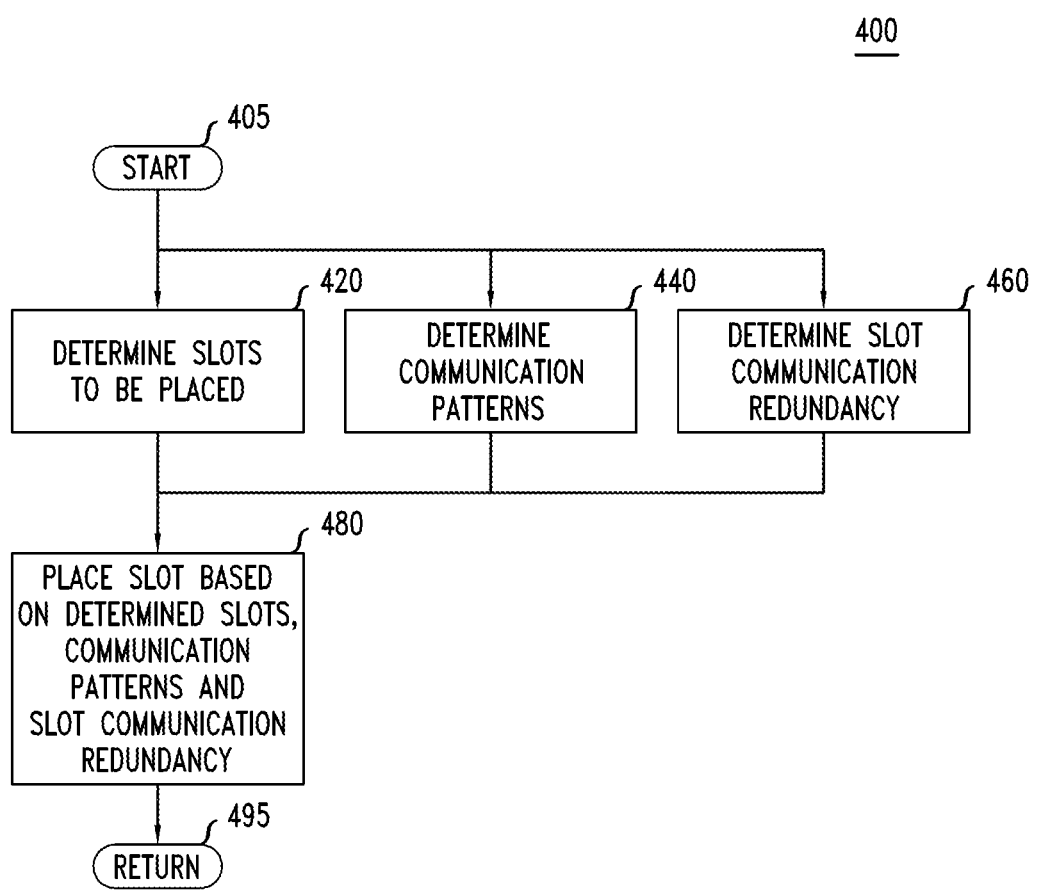
FIG. 4 depicts a flow chart illustrating an embodiment of a method 400 for a placement controller (e.g., placement controller 170 of FIG. 1) to place slots as illustrated in step 270 of FIG. 2.

FIG. 4 depicts a flow chart illustrating an embodiment of a method 400 for a placement controller (e.g., placement controller 170 of FIG. 1) to place slots in the end hosts as illustrated in step 270 of FIG. 2. The method includes placing the slots (step 480) based on a determined set of slots to be placed (step 420), the determined communication patterns (step 440) and the determined slot communication redundancy (step 460).

In the method 400, the step 420 includes determining the number and types of slots to place. In particular, the apparatus performing the method determines the number and type of slots required to support the applications instances serving clients (e.g., clients 190 in FIG. 1).

In the method 400, the step 440 includes determining communication patterns. In particular, communication patterns are derived from the communication patterns received from one or more agents (e.g., step 250 in FIG. 2). The communication patterns may be derived using any suitable mechanism such as: (a) using the received communication patterns; (b) modifying the received communication patterns; (c) aggregating the received communication patterns; or (d) the like.

In the method 400, the step 460 includes determining communication redundancy. In particular, communication redundancies are derived from the communication redundancies received from one or more agents (e.g., step 250 in FIG. 2). The communication redundancies may be derived using any suitable mechanism such as: (a) using the received communication redundancies; (b) modifying the received communication redundancies; (c) aggregating the received communication redundancies; or (d) the like.

In the method 400, the step 480 includes performing an RE-aware placement strategy based on the determined required slots, the determined communication patterns, and the determined slot redundancies. In particular, the RE-aware placement strategy takes into account the redundancy in data transfers for slot-to-slot communications and place slots to exploit redundancy in data transfers while minimizing the overall inter-rack (or inter-data center) bandwidth usage.

In some embodiments, the step 480 includes basing the placement of slots on the intra-comm-redundancy of slot-to-slot data transfers across racks, and the inter-comm-redundancy of two slot-to-slot transfers across racks. In some embodiments, the intra-comm-redundancy and inter-comm-redundancy are determined across data centers (e.g., data centers in distributed settings) instead of or in addition to as across racks.

In some embodiments, the step 480 includes using conventional integer linear program or classical optimization techniques to determine slot placement. Classical optimization techniques involve determining the action that best achieves a desired goal or objective. An action that best achieves a goal or objective may be determined by maximizing or minimizing the value of an objective function. In some embodiments, the goal or metric of the objective function may be to minimize the overall inter-container (e.g., inter-rack or inter-data center) bandwidth usage (e.g., $$\min \sum_a \sum_b u_{a,b}$$

where $u_{a,b}$ represents the bandwidth used between container $C_a$ and $C_b$).

The problem may be represented as:
Optimizing:

$$y = f(x_1, x_2, \ldots, x_n) \qquad [E.1]$$

Subject to:

$$G_j(x_1, x_2, \ldots, x_n) \begin{Bmatrix} \leq \\ = \\ \geq \end{Bmatrix} b_j \qquad [E.2]$$

$$j = 1, 2, \ldots m$$

Where the equation E.1 is the objective function and equation E.2 constitutes the set of constraints imposed on the solution. The $x_i$ variables, $x_1, x_2, \ldots, x_n$, represent the set of decision variables and $y=f(x_1, x_2, \ldots, x_n)$ is the objective function expressed in terms of these decision variables. It should be appreciated that the objective function may be maximized or minimized.

In some of any of these embodiments, constraints may be one or more of the following:

1. 
$$\sum_j x_{i,j} = 1;$$

where each slot is placed in one container and $x_{i,j}$ is a variable indicating the placement of slot(i) in container (j).

2. 
$$\sum_i x_{i,j} \leq Maxj;$$

where each container(j) has a limit Maxj on the maximum number of slots that the container may accommodate (e.g., based on capacity or provisioning parameters).

3. $y_{j,a,k,b} \geq x_{j,a} + x_{k,b} - 1$; where $y_{j,a,k,b}$ represents a variable that is 1 if slot(j) is placed in container(a) and slot (k) is placed in container(b) or otherwise zero.

4. Bandwidth towards usage across containers is based on contributions of each type of traffic (i.e., unique, intra-redundant and inter-redundant).
   a. The contribution of unique data transfers towards bandwidth usage between container Ca and Cb is $\sum_{j,k,j \neq k} Uni_{j,k} \times y_{j,a,k,b}$. Where $Uni_{j,k}$ is the amount of unique traffic between slots j and k. If slot(j) is placed in container $C_a$ and slot(k) is placed in container $C_b$, then it will contribute to the bandwidth usage between container $C_a \rightarrow C_b$.

b. The contribution of intra-redundant data transfers towards bandwidth usage between container $C_a$ and $C_b$ is zero. It should be appreciated that intra-redundant data will be suppressed by the RE mechanism.

c. The contribution of inter-redundant data transfer toward bandwidth usage is computed as follows: $\Sigma_{j,k,l,m, j \neq l \text{ or } k \neq m} \text{Inter}_{j,k,l,m} \times Z_{j,l,a,k,m,b}$. Where $\text{Inter}_{j,k,l,m}$ represents the inter-slot-redundancy, and $Z_{j,l,a,k,m,b}$ is a variable that represents when inter-slot redundancy will be suppressed. For example, when slot(j) and slot(k) are placed in containers $C_a$ and $C_b$ respectively (i.e., $y_{j,a,k,b}=1$), and slot(l) and slot(m) are also placed in containers $C_a$ and $C_b$ respectively (i.e., $y_{l,a,m,b}=1$), the inter-slot-redundant data will be suppressed by the RE mechanism and thusly, $z_{j,l,a,k,m,b}=0$. However, if $y_{j,a,k,b}=1$ and $y_{l,a,m,b}=0$, inter-slot-redundancy will not be suppressed and thusly, $z_{j,l,a,k,m,b}=1$.

5. The bandwidth between container $C_a$ and $C_b$ is less than available bandwidth $BW_{a,b}$: $u_{a,b} \leq BW_{a,b}$.

6. One or more slots are constrained to one or more identified containers. (e.g., $x_{j,a}=0$).

Figure 5:
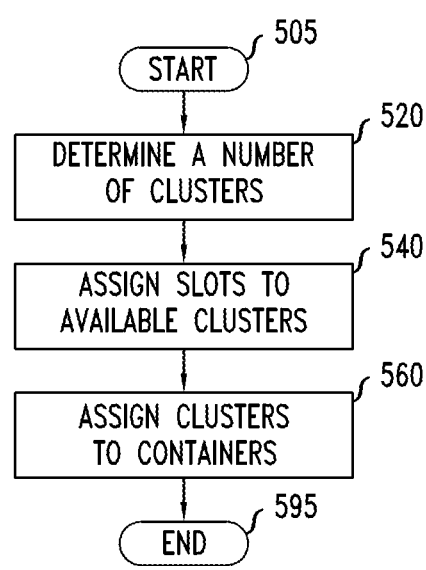
FIG. 5 depicts a flow chart illustrating an embodiment of a method 500 for placing slots as illustrated in step 480 of FIG. 4.

FIG. 5 depicts a flow chart illustrating an embodiment of a method 500 for placing slots as illustrated in step 480 of FIG. 4. The method includes determining a number of clusters (step 520), assign slots to available clusters (step 540), and assign clusters to containers (step 560).

In the method 500, the step 520 includes determining a number of clusters. In particular, the determined number of slots to be placed (e.g., step 420 in FIG. 4) are partitioned into "K" clusters, such that each partitioned cluster may be allocated in at least one container. The term "container" as used herein may be any suitable component capable of aggregating slots such as a rack within a data center setting or a data center itself within a distributed data center setting.

In some embodiments, a container is a rack.

In some embodiments, a container is a data center.

Figure 6:
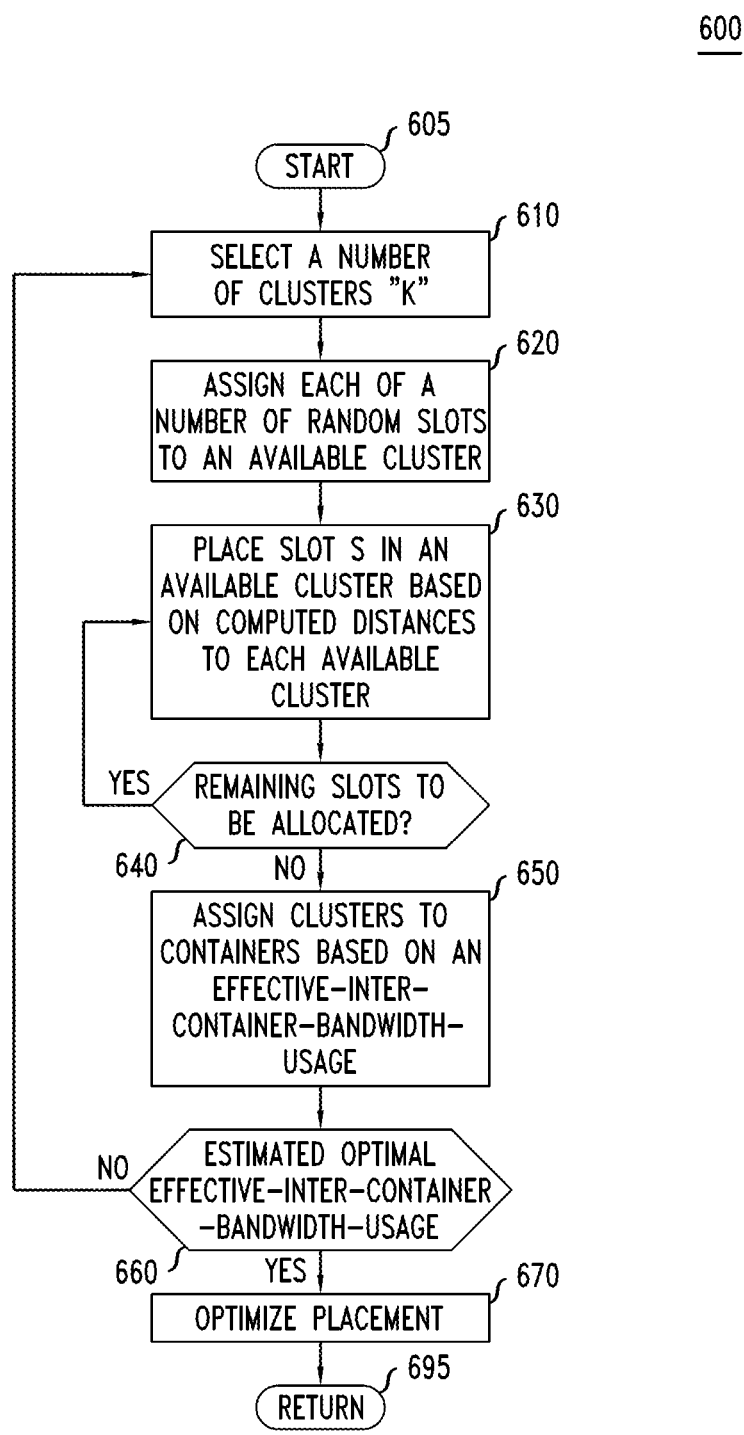
FIG. 6 depicts a flow chart illustrating an embodiment of a method 600 for placing slots as illustrated in step 480 of FIG. 4 and steps 520, 540 and 560 of FIG. 5.

FIG. 6 depicts a flow chart illustrating an embodiment of a method 600 for placing slots as illustrated in step 480 of FIG. 4 and steps 520, 540 and 560 of FIG. 5.

In the method 600, the step 610 includes selecting a number of clusters "K" as described herein. Where K is the number of clusters to which the determined slots are distributed.

In the method 600, the step 620 includes assigning each of a number of random slots to an available container. In some of these embodiments, the number of random slots assigned is "K".

In the method 600, the steps 630 and 640 include for each remaining slot "S" to be allocated (step 640), placing slot "S" in an available cluster based on computed distances to each available cluster (step 630).

In the method 600, the step 650 includes assigning clusters to containers based on an effective-inter-container-bandwidth-usage metric.

The method 600 optionally includes step 660. Step 660 includes determining whether the effective-inter-container-bandwidth-usage determined in step 650 meets a calculated optimal and whether the determined placement satisfies the constraint that each inter-container traffic (R1,R2) should be less than BW(R1,R2). Where BW is the available bandwidth between container R1 and R2. Determining a calculated optimal effective-inter-container-bandwidth-usage may be done using any suitable method such as: (a) setting an iterative count and selecting the best value; (b) comparing the determined effective-inter-container-bandwidth-usage from step 650 against a predetermined threshold; or (c) the like.

In the method 600, the step 670 includes optimizing the determined slot placement. In particular, optimization of slot placement includes determining whether moving container pairs would improve the effective-inter-container-bandwidth-usage. For example, exchanging S1 in C1 with S2 in C2 may be based on a determination that moving S1 in container C1 to container C2, and moving S2 in container C2 to C1 improves the effective-inter-container-bandwidth-usage.

In some embodiments of step 610, K is selected based on the number of available slots in each container.

In some embodiments of step 610, K is selected randomly.

In some embodiments, step 630 includes computing the distances to each available cluster and placing slot S in an available cluster based on the computed distances to each available cluster. Where an available cluster is a cluster that is not filled (i.e., has assigned slots than capacity).

In some of these embodiments of step 630, computing distances to each candidate cluster (e.g., cluster C) is based on an effective-bandwidth metric (M). In particular, the effective-bandwidth metric is the bandwidth required after redundancy elimination within the data transfer from slot S to any of the other slots in the cluster (intra-comm-redundancy) and across data transfers slot S to any slot i, and slot S to any slot j in the cluster (inter-comm-redundancy).

In some of these embodiments the effective-bandwidth metric, is computed as described in the pseudo code lines (1)-(3).

(1) $M\_from(S) =$ $$\sum_{slot-i \in C} (\text{Demand}(slot\text{-}S, slot\text{-}i) - \text{Intra Redundancy}(slot\text{-}S, slot\text{-}i)) -$$

$$\sum_{slot-i, slot-j \in C} (\text{Inter Redundancy}(slot\text{-}S, slot\text{-}i, slot\text{-}S, slot\text{-}j))$$

(2) $M\_to(S) =$ $$\sum_{slot-i \in C} (\text{Demand}(slot\text{-}i, slot\text{-}S) - \text{Intra redundancy}(slot\text{-}i, slot\text{-}S)) -$$

$$\sum_{slot-i, slot-j \in C} (\text{Inter Redundancy}(slot\text{-}i, slot\text{-}S, slot\text{-}j, slot\text{-}S))$$

(3) $M(S) = M\_from(S) + M\_to(S)$

Where: the function Demand(slot-i,slot-j) returns the bandwidth demand between slots "i" and "j"; the function IntraRedundancy(slot i,slot j) returns the intra-comm-redundancy for data transfers from slot i to slot j; and the function InterRedundancy(slot i, slot j, slot k, slot l) returns the inter-comm-redundancy between data transfers (slot i, slot j) and data transfers (slot k, slot l).

In some embodiments of step 630, the cluster placement selection is based on a calculated minimum average distance to cluster C (Min(C)). In some of these embodiments, the Min(C) is computed as shown in pseudo code lines (4)-(6).

(4) for each cluster C
   (5) compute AvgDistance(C)= (1/N * 1/M(S));
     // where N is the number of slots in the cluster C
   (6) Min(C) = Min | AvgDistance(C) |

It should be appreciated that by taking the inverse of the effective bandwidth metric (e.g., M(S)), and choosing the minimum (slot, container) pair, slots with high bandwidth demands to a container will be placed in that container, potentially reducing the traffic that would traverse across containers (e.g., reduce the effective inter-container-bandwidth-usage).

In some embodiments, the steps 610-640 are as described in FIG. 7. Where VM are virtual machines (e.g., a type of slot); Mindist$_u$ is the minimum average distance to cluster C; MinVM and MinC are the respective VM and containers associated with the Mindist$_u$; Uni$_{u,v}$ is the amount of unique traffic between VMs u and v; and Inter$_{j,k,l,m}$ is the inter-VM redundant traffic demands for redundancy between data transfers from VM$_j$→VM$_k$ and VM$_l$→VM$_m$.

In some embodiments of step 650, effective inter-container-bandwidth-usage is computed as the sum of all inter-container bandwidth demands minus inter-container redundant traffic (including both intra-comm-redundant traffic and inter-comm-redundant traffic). In some of these embodiments, the effective inter-container-bandwidth-usage is computed as shown in pseudo code is lines (7)-(10).

---

(7) Effective-intercontainer-bandwidth-usage = 0
(8) For each container Ci, Cj in pair
   (9) Find the list of (slot i, slot j) communications such that slot i and
      slot j are in different containers;
   (10)    Effective-intercontainer-bandwidth-usage +=

$$\sum_{slot-i, slot-j} (\text{Demand}(slot\text{-}i, slot\text{-}j)) -$$

$$\sum_{slot-i, slot-j} (\text{Intra Redundancy}(slot\text{-}i, slot\text{-}j)) -$$

$$\sum_{slot-i, slot-j, slot-k, slot-l} (\text{Inter Reduncancy}(slot\text{-}i, slot\text{-}j, slot\text{-}k, slot\text{-}l));$$

// where slot i and slot k are in one container and
      // slot j and slot k are in another container

---

In some embodiments, the step 650 is as described in FIG. 8. Where VM are virtual machines (e.g., a type of slot); Uni$_{u,v}$ is the amount of unique traffic between VMs u and v; and Inter$_{j,k,l,m}$ is the inter-VM redundant traffic demands for redundancy between data transfers from VM$_j$→VM$_k$ and VM$_l$→VM$_m$.

In some embodiments of step 670, the optimization determination is computed as shown in pseudo code lines (11)-(16).

---

(11)    for each container Ci, Cj pair;
(12)    for each slot k in Ci;
    (13)    for each slot I in Cj, determine whether exchanging
          slot k with slot I improves the
          effective inter-container bandwidth usage;
    (14)    select the slot Imax
          // where Imax is the slot I with the best calculated
          // effective inter-container-bandwidth usage metric;
    (15)    if slot k ≠ slot Imax &&
          the exchange does not violate the
          inter-container bandwidth constraints
    (16)        exchange slot k with slot Imax;

---

In some embodiments, the step 670 is as described in FIG. 9.

In some embodiments, method 600 includes slot placement constraint(s). In particular, for some slots, only a subset of containers is available for slot placement. In some of these embodiments, the selection of the subset of available containers is based on a quality of service metric such as latency.

In some of these embodiments, a number of containers ("K") is selected and a set of randomly chosen K slots is assignment to the K containers using a one-to-one correspondence and ensuring that the slot placement constraint(s) are met. In step 630, in computing the distance of a slot to the containers, only containers meeting the slot placement constraint(s) are considered. In step 670, only exchanges meeting slot placement constraints are performed.

Although primarily depicted and described in a particular sequence, it should be appreciated that the steps shown in methods 200, 400, 500 and 600 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 10:
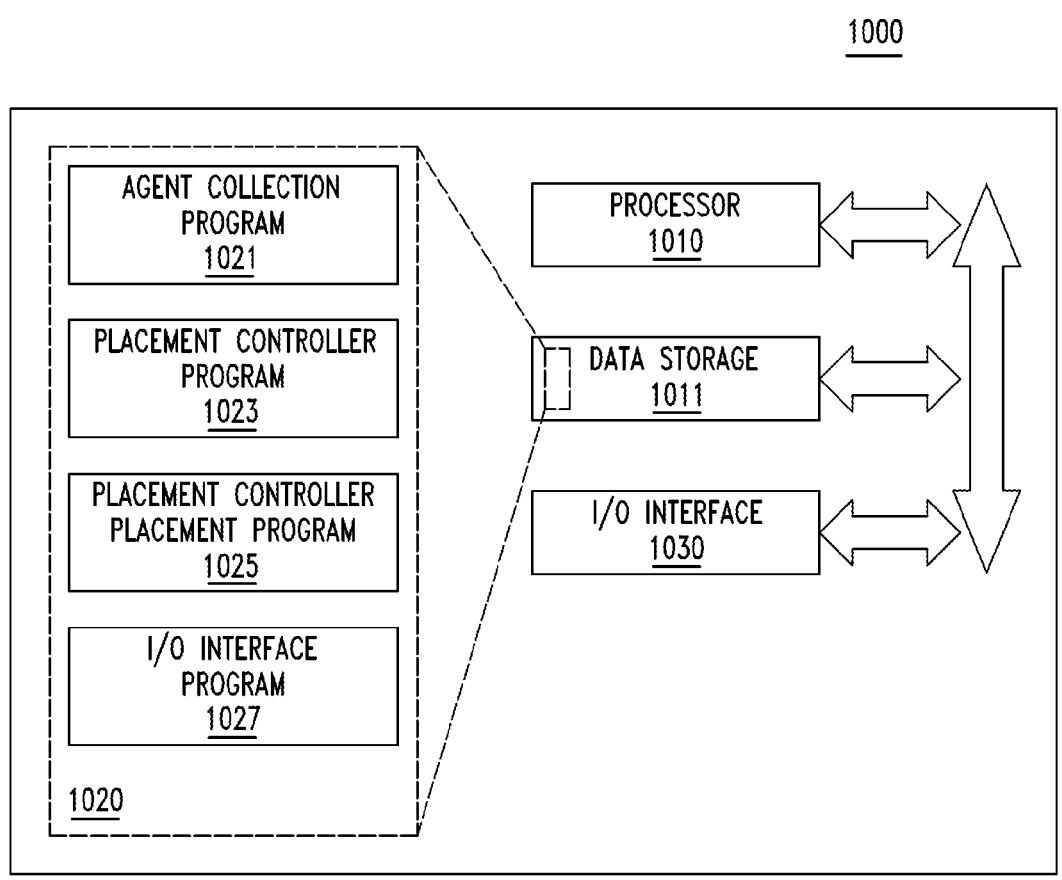
FIG. 10 schematically illustrates an embodiment of various apparatus 1000 such as one ene of end hosts 120, one of ToR switches 130, one of aggregation switches 150, or placement controller 170 of FIG. 1.

FIG. 10 schematically illustrates an embodiment of various apparatus 1000 such as one of end hosts 120, one of ToR switches 130, one of aggregation switches 150 or placement controller 170 of FIG. 1. The apparatus 1000 includes a processor 1010, a data storage 1011, and optionally an I/O interface 1030.

The processor 1010 controls the operation of the apparatus 1000. The processor 1010 cooperates with the data storage 1011.

The data storage 1011 may store program data such as redundancy measurements, communication patterns or the like as appropriate. The data storage 1011 also stores programs 1020 executable by the processor 1010.

The processor-executable programs 1020 may include an agent collection program 1021, a placement controller program 1023, a placement controller placement program 1025, or an I/O interface program 1027 as appropriate. Processor 1010 cooperates with processor-executable programs 1020.

The I/O interface 1030 cooperates with processor 1010 and I/O interface program 1027 to support communications over any appropriate communication channel(s) such as links of FIG. 1.

The agent collection program 1021 performs the steps 210-1, 220-1 and 230-1 of method 200 of FIG. 2 as described above.

The placement controller program 1023 performs the steps 250, 260, and 270 of method 200 of FIG. 2 as described above.

The placement controller placement program 1025 performs the steps of method 270 of FIG. 2, the steps of FIG. 4, the steps of FIG. 5 or the steps of FIG. 6 as described above.

In some embodiments, the processor 1010 may include resources such as processors/CPU cores, the I/O interface 1030 may include any suitable network interfaces, or the data storage 1011 may include memory or storage devices. Moreover the apparatus 1000 may be any suitable physical hardware configuration such as: one or more server(s), blades consisting of components such as processor, memory, network interfaces or storage devices. In some of these embodiments, the apparatus 1000 may include cloud network resources that are remote from each other.

In some embodiments, the apparatus 1000 may be virtual machine. In some of these embodiments, the virtual machine may include components from different machines or be geographically dispersed. For example, the data storage 1011 and the processor 1010 may be in two different physical machines.

In some embodiments, the apparatus 1000 may be a general purpose computer programmed to perform the methods 200, 400, 500 or 600.

When processor-executable programs 1020 are implemented on a processor 1010, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing slot placement, the apparatus comprising:
a data storage; and
a processor communicatively connected to the data storage, the processor being configured to:
determine a plurality of slots to be placed within a plurality of containers;
determine a plurality of redundancy parameters based on communication redundancy between at least a portion of the plurality of slots;
determine a placement of the plurality of slots in the plurality of containers based on the plurality of redundancy parameters; and
exchange a first placed slot and a second placed slot based on a determination that inter-container-bandwidth-usage will be improved and that the exchange meets one or more inter-container bandwidth constraints.

2. The apparatus of claim 1, wherein a plurality of the plurality of slots are virtual machines.

3. The apparatus of claim 1, wherein a plurality of the plurality of containers are racks in a data center.

4. The apparatus of claim 1, wherein the redundancy parameters are based on intra-comm-redundancy and inter-comm-redundancy of at least a portion of the plurality of slots.

5. The apparatus of claim 4, wherein the redundancy parameters are based on communication patterns of at least a portion of the plurality of slots.

6. The apparatus of claim 1, wherein the determination of the placement of the plurality of slots comprises configuring the processor to:
determine a plurality of clusters;
assign each of at least a portion of the plurality of slots to at least one of the plurality of clusters; and
assign each of at least a portion of the plurality of clusters to the at least one of the plurality of containers.

7. The apparatus of claim 6, wherein the assignment of the portion of the plurality of slots is based on a required slot bandwidth after redundancy elimination.

8. The apparatus of claim 7, wherein the assignment of the portion of the plurality of slots is further based on one or more slot placement constraints.

9. The apparatus of claim 6, wherein the assignment of the portion of the plurality of clusters is based on an effective-inter-container-bandwidth-usage.

10. A system for providing slot placement, the system comprising:
a placement controller;
a plurality of agents communicatively connected to the placement controller, each of the plurality of agents configured to:

collect a plurality of redundancy measurements based on communication redundancy between at least a portion of the plurality of slots; and send the plurality of redundancy measurements to the placement controller; and the placement controller configured to:

receive the plurality of redundancy measurements;

determine a plurality of slots to be placed within a plurality of containers;

determine a plurality of redundancy parameters based on the plurality of redundancy measurements;

determine a placement of the plurality of slots in the plurality of containers based on the plurality of redundancy parameters; and exchange a first placed slot and a second placed slot based on a determination that inter-container-bandwidth-usage will be improved and that the exchange meets one or more inter-container bandwidth constraints.

11. The system of claim 10, wherein the determination of the placement of the plurality of slots comprises configuring the placement controller to:

determine a plurality of clusters;

assign each of at least a portion of the plurality of slots to at least one of the plurality of clusters; and assign each of at least a portion of the plurality of clusters to the at least one of the plurality of containers.

12. The system of claim 11, wherein the assignment of the portion of the plurality of slots is based on a required slot bandwidth after redundancy elimination.

13. The system of claim 12, wherein the assignment of the portion of the plurality of slots is further based on one or more slot placement constraints.

14. The system of claim 11, wherein the assignment of the portion of the plurality of clusters is based on an effective-inter-container-bandwidth-usage.

15. A method for providing slot placement, the method comprising:

at a processor communicatively connected to a data storage, determining a plurality of slots to be placed within a plurality of containers;

determining, by the processor in cooperation with the data storage, a plurality of redundancy parameters based on communication redundancy between at least a portion of the plurality of slots;

determining, by the processor in cooperation with the data storage, a placement of the plurality of slots in the plurality of containers based on the plurality of redundancy parameters; and exchanging, by the processor in cooperation with the data storage, a first placed slot and a second placed slot based on a determination that inter-container-bandwidth-usage will be improved and that the exchange meets one or more inter-container bandwidth constraints.

16. The method of claim 15, wherein the step of determining the placement of the plurality of slots comprises:

determining, by the processor in cooperation with the data storage, a plurality of clusters;

assigning, by the processor in cooperation with the data storage, each of at least a portion of the plurality of slots to at least one of the plurality of clusters; and assigning, by the processor in cooperation with the data storage, each of at least a portion of the plurality of clusters to the at least one of the plurality of containers.

17. The method of claim 16, wherein the step of assigning the portion of the plurality of slots is based on a required slot bandwidth after redundancy elimination.

* * * * *